United States Patent
Smith et al.

(10) Patent No.: US 10,788,640 B2
(45) Date of Patent: Sep. 29, 2020

(54) SPLICE MANAGERS AND RELATED METHODS OF USE

(71) Applicant: Ortronics, Inc., New London, CT (US)

(72) Inventors: Daniel M. Smith, Westerly, RI (US); Ryan J. Grandidge, Wakefield, RI (US); Rudolph A. Montgelas, West Hartford, CT (US)

(73) Assignee: Ortronics, Inc., New London, CT (US)

( * ) Notice: Subject to any disclaimer, the term of this patent is extended or adjusted under 35 U.S.C. 154(b) by 0 days.

(21) Appl. No.: 15/807,039

(22) Filed: Nov. 8, 2017

(65) Prior Publication Data
US 2018/0129005 A1 May 10, 2018

Related U.S. Application Data

(60) Provisional application No. 62/419,048, filed on Nov. 8, 2016.

(51) Int. Cl.
*G02B 6/44* (2006.01)

(52) U.S. Cl.
CPC .................. *G02B 6/4454* (2013.01)

(58) Field of Classification Search
CPC ...................................................... G02B 6/44
USPC ........................................................ 385/135
See application file for complete search history.

(56) References Cited

U.S. PATENT DOCUMENTS

| | | | | |
|---|---|---|---|---|
| 5,119,459 A | * | 6/1992 | Meyerhoefer | G02B 6/4454 385/135 |
| 5,247,603 A | * | 9/1993 | Vidacovich | G02B 6/4452 385/134 |
| 5,647,045 A | * | 7/1997 | Robinson | G02B 6/4454 385/135 |
| 5,825,962 A | * | 10/1998 | Walters | G02B 6/4452 385/135 |
| 6,009,225 A | * | 12/1999 | Ray | G02B 6/4455 385/135 |
| 6,201,920 B1 | * | 3/2001 | Noble | G02B 6/4441 385/134 |
| 7,418,184 B1 | * | 8/2008 | Gonzales | G02B 6/4471 385/134 |
| 7,620,288 B2 | | 11/2009 | Smrha et al. | |
| 8,750,667 B2 | * | 6/2014 | Le Dissez | G02B 6/4452 385/135 |

(Continued)

OTHER PUBLICATIONS

U.S. Appl. No. 62/419,048, filed Nov. 8, 2016.

*Primary Examiner* — Kaveh C Kianni
(74) *Attorney, Agent, or Firm* — McCarter & English, LLP

(57) ABSTRACT

Improved cable management assemblies and related methods of use are provided. The present disclosure provides advantageous systems for the design and use of splice managers configured to provide for user-friendly access for the splicing of media cables (e.g., optical fiber cables), while also providing for the management and storage of the spliced cables. An exemplary splice manager includes two integral spools, the splice manager being removable from the assembly housing (e.g., from the splice cassette/tray) to allow for the splicing of the fibers to be performed out in the open, and then enable the fiber excess from both the input cable and the fiber harness of the assembly housing to be spooled independently of one another on a respective spool, and then allow the splice manager to be re-mounted to the assembly housing (e.g., within the enclosure space of the splice cassette).

25 Claims, 13 Drawing Sheets

(56) References Cited

U.S. PATENT DOCUMENTS

| | | | | |
|---|---|---|---|---|
| 8,886,003 B2* | 11/2014 | Nieves | G02B 6/4446 |
| | | | 385/134 |
| 9,709,766 B2* | 7/2017 | Claessens | G02B 6/4453 |
| 2002/0051616 A1* | 5/2002 | Battey | G02B 6/4442 |
| | | | 385/135 |
| 2002/0150372 A1* | 10/2002 | Schray | G02B 6/3897 |
| | | | 385/135 |
| 2002/0159746 A1* | 10/2002 | Howell | G02B 6/4453 |
| | | | 385/135 |
| 2003/0174996 A1* | 9/2003 | Henschel | G02B 6/2804 |
| | | | 385/135 |
| 2004/0086252 A1* | 5/2004 | Smith | G02B 6/4453 |
| | | | 385/135 |
| 2004/0120680 A1* | 6/2004 | Dillat | G02B 6/4455 |
| | | | 385/135 |
| 2006/0215980 A1 | 9/2006 | Bayazit et al. | |
| 2007/0086721 A1* | 4/2007 | Dobbins | G02B 6/445 |
| | | | 385/135 |
| 2008/0124038 A1* | 5/2008 | Kowalczyk | G02B 6/444 |
| | | | 385/135 |
| 2009/0097813 A1* | 4/2009 | Hill | G02B 6/4454 |
| | | | 385/135 |
| 2009/0252472 A1* | 10/2009 | Solheid | G02B 6/4447 |
| | | | 385/135 |
| 2010/0142910 A1* | 6/2010 | Hill | G02B 6/4454 |
| | | | 385/135 |
| 2011/0268407 A1* | 11/2011 | Cowen | G02B 6/4452 |
| | | | 385/135 |
| 2011/0268411 A1* | 11/2011 | Giraud | G02B 6/4452 |
| | | | 385/135 |
| 2011/0268412 A1* | 11/2011 | Giraud | G02B 6/4452 |
| | | | 385/135 |
| 2011/0274402 A1* | 11/2011 | Giraud | G02B 6/4452 |
| | | | 385/135 |
| 2015/0253528 A1* | 9/2015 | Corbille | G02B 6/4454 |
| | | | 385/135 |
| 2015/0346450 A1* | 12/2015 | Barnes, Jr. | G02B 6/445 |
| | | | 385/135 |
| 2016/0109672 A1* | 4/2016 | Geens | G02B 6/4452 |
| | | | 29/453 |
| 2016/0259129 A1* | 9/2016 | Geens | G02B 6/4455 |
| 2017/0192192 A1* | 7/2017 | Mead | G02B 6/445 |

\* cited by examiner

SPLICE MANAGERS AND RELATED METHODS OF USE

CROSS-REFERENCE TO RELATED APPLICATION

The present application claims priority benefit to a provisional application entitled "Splice Managers and Related Methods of Use," which was filed on Nov. 8, 2016, and assigned Ser. No. 62/419,048. The entire content of the foregoing provisional patent application is incorporated herein by reference.

FIELD OF THE DISCLOSURE

The present disclosure relates to cable management assemblies and related methods of use and, more particularly to the design and use of splice managers configured to provide for: (i) user-friendly access for the splicing of media cables (e.g., optical fiber cables), and (ii) the management and storage of the spliced media cables.

BACKGROUND OF THE DISCLOSURE

In general, some systems and devices for attempting to manage spliced media cables are known. See, e.g., U.S. Pat. No. 7,620,288, and U.S. Patent Pub. No. 2006/0215980, the entire contents of each being hereby incorporated by reference in their entireties.

An interest exists for improved cable management assemblies and related components, and related methods of use. These and other inefficiencies and opportunities for improvement are addressed and/or overcome by the assemblies, systems and methods of the present disclosure.

SUMMARY OF THE DISCLOSURE

The present disclosure provides advantageous cable management assemblies and related devices, and improved methods/systems for using the same. The present disclosure provides advantageous splice managers configured to provide for user-friendly access for the splicing of media cables (e.g., optical fiber cables), with the splice managers also providing for the management and storage of the spliced media cables.

For example and in certain embodiments, the present disclosure provides for a splice manager having two integral spools, the splice manager being removable from an assembly housing (e.g., removable from a splice cassette or a splice tray) to allow for the fusion splicing of the optical fibers to be performed out in the open, and then enable the fiber excess from both the input trunk/harness cable and the fiber harness of the assembly housing to be spooled independently of one another on a respective spool of the splice manager, and then allow the splice manager to be re-mounted to the assembly housing (e.g., mounted/positioned neatly within or into the rear enclosure space of a splice cassette).

The present disclosure provides for a splice manager including a base wall that extends from a first end to a second end and that extends from a first side to a second side, the base wall including a first spool member, a second spool member, and one or more splice holders; wherein the base wall is configured to be removably mounted to a housing; wherein when the base wall is not mounted to the housing, this allows for the fusion splicing of a plurality of optical fibers to be performed out in the open and away from the housing, and then allows the fiber slack from an input cable to be spooled around the second spool member and allows the fiber slack from a fiber harness from the housing to be spooled around the first spool member; wherein at least one splice protection sleeve assembly of spliced optical fibers is positioned in the one or more splice holders; and wherein after spooling the fiber slack on the respective first and second spool members, the base wall is configured to be re-mounted to the housing.

The present disclosure also provides for a splice manager wherein the housing is a splice cassette or a splice tray. The present disclosure also provides for a splice manager wherein the base wall includes a first aperture and a second aperture extending therethrough; wherein the housing includes a first protrusion and a second protrusion, the first protrusion configured to be inserted through the first aperture, and the second protrusion configured to be inserted through the second aperture to removably mount the base wall to the housing.

The present disclosure also provides for a splice manager wherein the first spool member includes a circular wall that extends upwardly from the base wall; and wherein the second spool member includes a first curved wall portion and a second curved wall portion, the first and second curved wall portions each extending upwardly from the base wall.

The present disclosure also provides for a splice manager wherein the first curved wall portion is positioned proximal to the first end, and extends from a position that is proximal to the first side and the first end to a position that is proximal to the second side and the first end; and wherein the second curved wall portion is positioned proximal to the second end, and extends from a position that is proximal to the first side and the second end to a position that is proximal to the second side and the second end.

The present disclosure also provides for a splice manager further including curved guide walls extending from the base wall, with a first plurality of curved guide walls extending upwardly from the base wall proximal to the first side, and a second plurality of curved guide walls extending upwardly from the base wall proximal to second side.

The present disclosure also provides for a splice manager wherein the one or more splice holders are positioned between the first and second pluralities of curved guide walls. The present disclosure also provides for a splice manager wherein each splice holder of the one or more splice holders is configured and dimensioned to hold two splice protection sleeve assemblies.

The present disclosure also provides for a splice manager wherein the circular wall of the first spool member is positioned within or inside of the first and second curved wall portions of the second spool member, with the first and second curved wall portions of the second spool member extending substantially around the outer periphery of the base wall.

The present disclosure also provides for a splice manager wherein the first spool member includes an oval or elliptical wall that extends upwardly from the base wall; and wherein the second spool member includes a first curved wall portion, a second curved wall portion, and a third curved wall portion, the first, second and third curved wall portions each extending upwardly from the base wall.

The present disclosure also provides for a splice manager wherein the first curved wall portion is positioned proximal to the first end, and extends from a position that is proximal to the first side and the first end to a position that is proximal to the first end; wherein the second curved wall portion is positioned proximal to the second end, and extends from a position that is proximal to the first side and the second end to a position that is proximal to the second side and the second end; and wherein the third curved wall portion is positioned proximal to the first end, and extends from a position that is proximal to the second side and the first end to a position that is proximal to the first end.

The present disclosure also provides for a splice manager wherein the ellipse or oval defined by first spool member is substantially concentric with an ellipse or oval defined by the second spool member. The present disclosure also provides for a splice manager wherein the first spool member includes an oval or elliptical wall that extends upwardly from the base wall; and wherein the second spool member includes an oval or elliptical wall that extends upwardly from the base wall.

The present disclosure also provides for a splice manager wherein the first spool member is positioned proximal to the second end, and the second spool member is positioned proximal to the first end. The present disclosure also provides for a splice manager wherein the base wall includes a first curved wall portion and a second curved wall portion extending upwardly from the base wall, the first curved wall portion positioned proximal to the first end, and the second curved wall portion positioned proximal to the second end; wherein the first and second curved wall portions include one or more planar divider layer members; wherein the first spool member is defined by the area of the first and second curved wall portions that extend from the base wall to the bottom of the divider layer members; and wherein the second spool member is defined by the area of the first and second curved wall portions that extend from the top of divider layer members to the top surfaces of the first and second curved wall portions.

The present disclosure also provides for a method for utilizing a splice manager including providing a base wall that extends from a first end to a second end and that extends from a first side to a second side, the base wall including a first spool member, a second spool member, and one or more splice holders; removably mounting the base wall to a housing; removing the base wall from the housing; fusion splicing a plurality of optical fibers out in the open and away from the housing; spooling the fiber slack from an input cable around the second spool member and spooling the fiber slack from a fiber harness from the housing around the first spool member; positioning at least one splice protection sleeve assembly of spliced optical fibers in the one or more splice holders; and re-mounting the base wall to the housing.

The present disclosure also provides for a method for utilizing a splice manager wherein the first spool member includes a circular wall that extends upwardly from the base wall; wherein the second spool member includes a first curved wall portion and a second curved wall portion, the first and second curved wall portions each extending upwardly from the base wall; wherein the first curved wall portion is positioned proximal to the first end, and extends from a position that is proximal to the first side and the first end to a position that is proximal to the second side and the first end; and wherein the second curved wall portion is positioned proximal to the second end, and extends from a position that is proximal to the first side and the second end to a position that is proximal to the second side and the second end.

The present disclosure also provides for a method for utilizing a splice manager wherein the first spool member includes an oval or elliptical wall that extends upwardly from the base wall; and wherein the second spool member includes a first curved wall portion, a second curved wall portion, and a third curved wall portion, the first, second and third curved wall portions each extending upwardly from the base wall.

The present disclosure also provides for a method for utilizing a splice manager wherein the first spool member includes an oval or elliptical wall that extends upwardly from the base wall; and wherein the second spool member includes an oval or elliptical wall that extends upwardly from the base wall.

The present disclosure also provides for a method for protecting optical fibers including providing a pre-cleaved optical fiber, a protection sleeve assembly positioned over a portion of the pre-cleaved optical fiber; providing a carrier tube and a gripping member for the pre-cleaved optical fiber, the gripping member having a flexible middle section that extends from a first end to a second end, the first end having a first grip portion and the second end having a second grip portion; flexing the middle section to allow the first and second grip portions to fit together and grip the optical fiber; inserting the gripped optical fiber, the first and second grip portions, and at least a portion of the protection sleeve assembly into the carrier tube; wherein the carrier tube is configured and dimensioned to hold and house a cleaved end of the optical fiber.

The present disclosure also provides for a method for protecting optical fibers further including removing the optical fiber, the first and second grip portions, and the protection sleeve assembly from the carrier tube by pulling on the middle section of the gripping member; and removing the gripping member from the optical fiber.

Any combination or permutation of embodiments is envisioned. Additional advantageous features, functions and applications of the disclosed assemblies, systems and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various features, steps and combinations of features/steps described below and illustrated in the figures can be arranged and organized differently to result in embodiments which are still within the scope of the present disclosure. To assist those of ordinary skill in the art in making and using the disclosed assemblies, systems and methods, reference is made to the appended figures, wherein.

DETAILED DESCRIPTION OF DISCLOSURE

Figure 1:
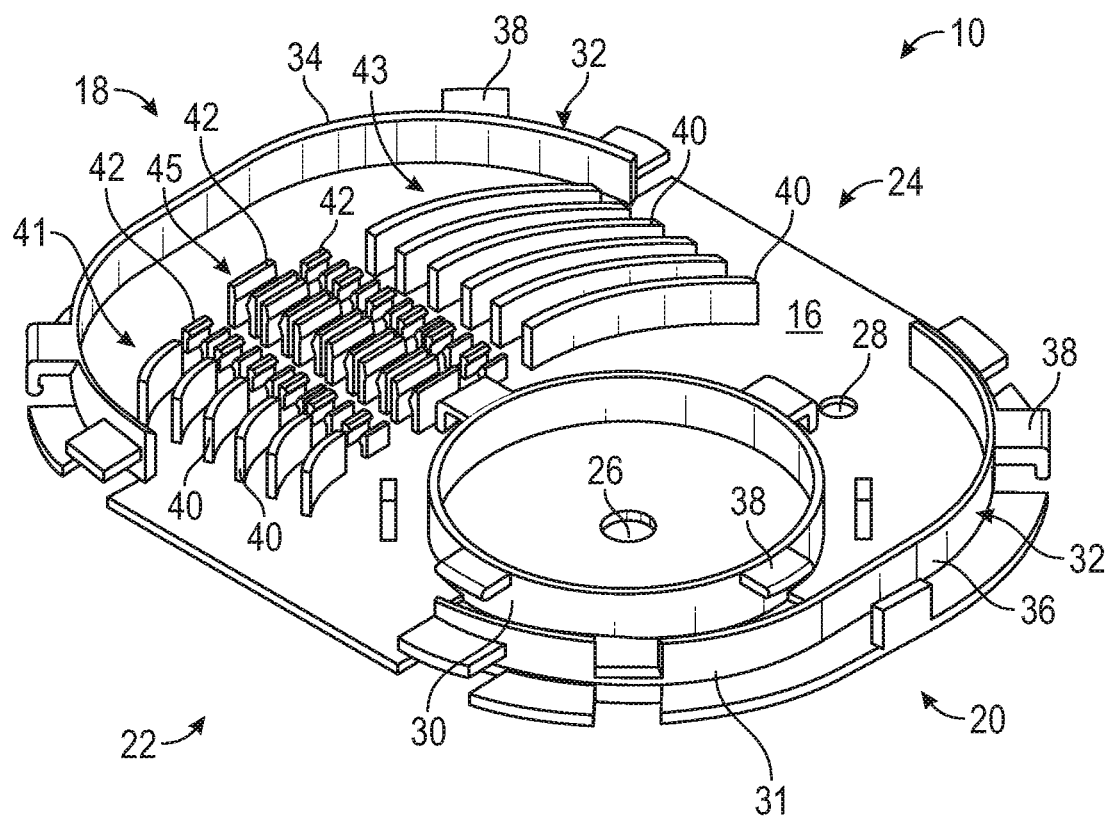
FIG. 1 is a top perspective view of an exemplary splice manager according to the present disclosure.

The exemplary embodiments disclosed herein are illustrative of advantageous splice managers, and systems of the present disclosure and methods/techniques thereof. It should be understood, however, that the disclosed embodiments are merely exemplary of the present disclosure, which may be embodied in various forms. Therefore, details disclosed herein with reference to exemplary assemblies/fabrication methods and associated processes/techniques of assembly and use are not to be interpreted as limiting, but merely as the basis for teaching one skilled in the art how to make and use the advantageous assemblies/systems and/or alternative assemblies of the present disclosure.

The present disclosure provides improved cable management assemblies and related devices, and related methods of use. The present disclosure provides advantageous splice managers configured to provide for user-friendly access for the splicing of media cables (e.g., optical fiber cables), with the splice managers also providing for the management and storage of the spliced media cables.

In an exemplary embodiment, the present disclosure provides for a splice manager having two integral spools. The splice manager is removable from an assembly housing (e.g., removable from a splice cassette or a splice tray) to allow for the fusion splicing of the optical fibers to be performed out in the open, and then enable the fiber excess from both the input trunk/harness cable and the fiber harness of the splice cassette to be spooled independently of one another on a respective spool of the splice manager. The splice manager can then be mounted or re-mounted to the assembly housing (e.g., mounted/positioned neatly within or into the rear enclosure space of the splice cassette).

Referring now to the drawings, like parts are marked throughout the specification and drawings with the same reference numerals, respectively. Drawing figures are not necessarily to scale and in certain views, parts may have been exaggerated for purposes of clarity.

Figure 2:
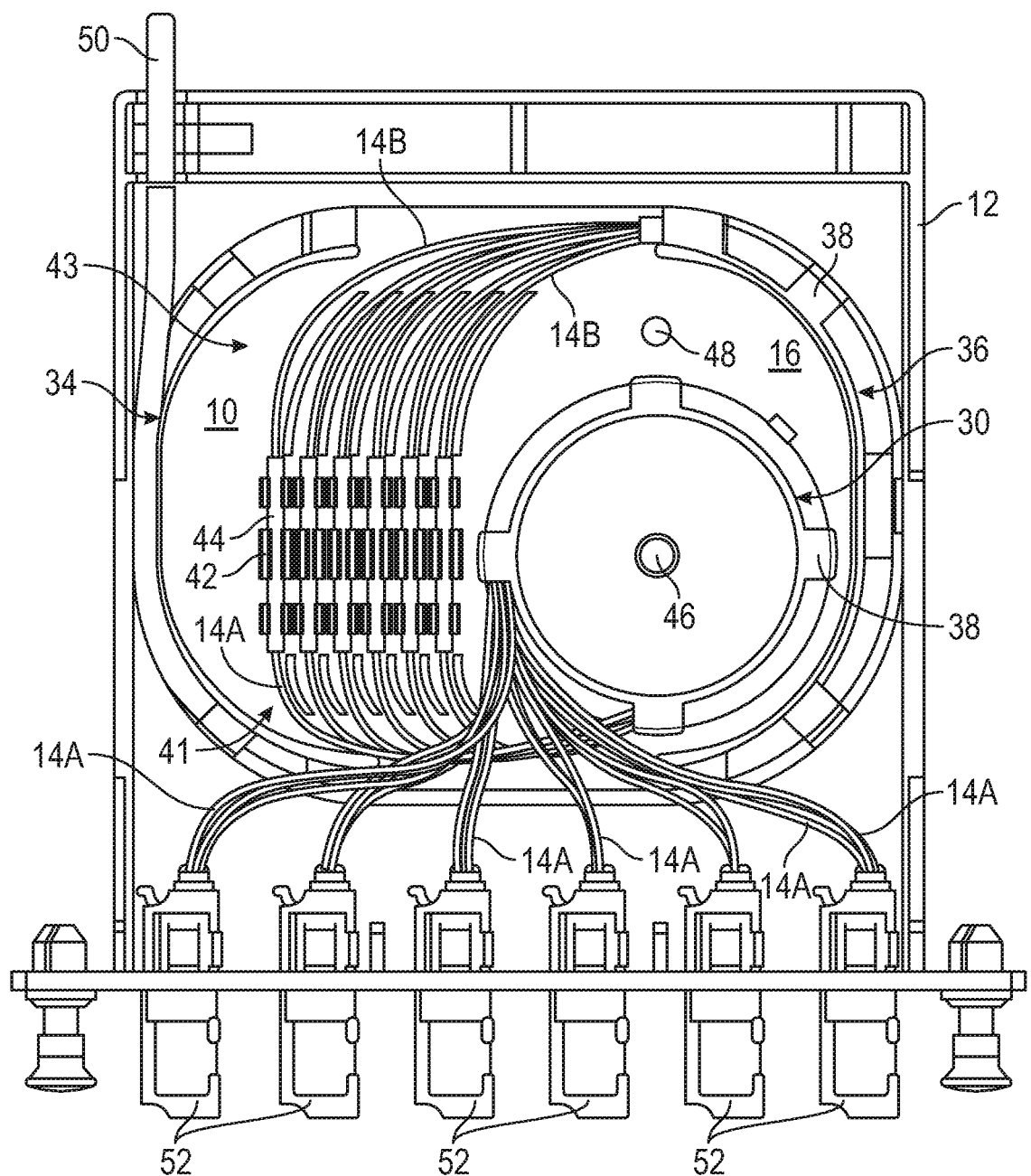
FIG. 2 is a top view of the splice manager of FIG. 1, the splice manager mounted to a splice cassette housing.
Figure 3:
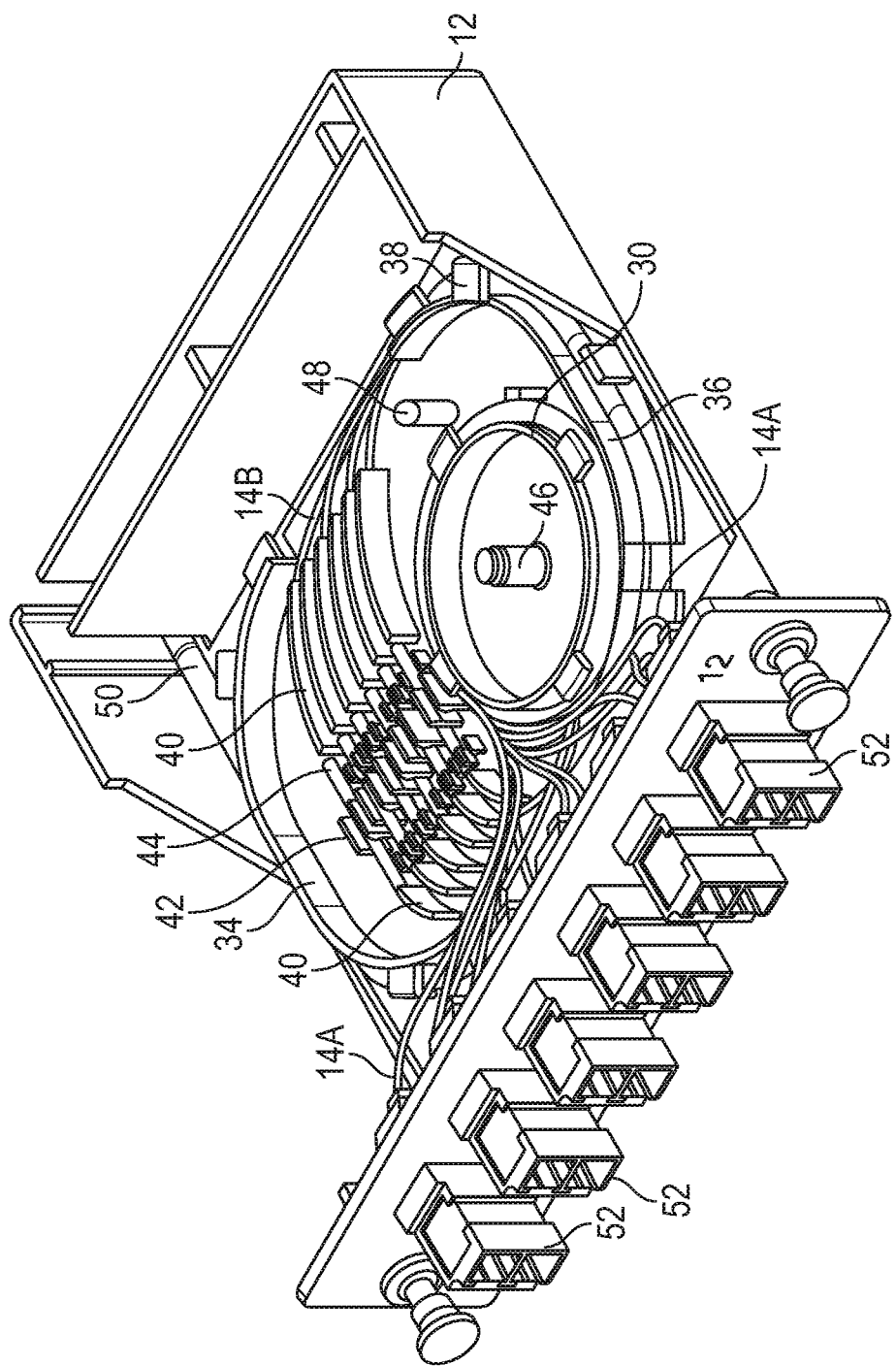
FIG. 3 is a top perspective view of the splice manager and splice cassette housing of FIG. 2.

With reference to FIGS. 1-3, there is illustrated an embodiment of an exemplary splice manager 10 according to the present disclosure. In general, splice manager 10 is configured and dimensioned to hold, house and store optical fiber cables 14A, 14B (e.g., single-fiber optical cables 14A, 14B). As discussed further below, splice manager 10 is configured to be removably mounted with respect to assembly housing 12. As shown in FIGS. 2-3, exemplary assembly housing 12 takes the form of a splice cassette 12 or the like, although the present disclosure is not limited thereto. Rather, housing 12 can take a variety of forms/designs (e.g. splice tray, etc.). As shown in FIGS. 2-3, splice manager 10 can be mounted and positioned neatly within or into the enclosure space (e.g., rear enclosure space) of the splice cassette 12.

As shown in FIG. 1, exemplary splice manager 10 includes a base wall 16 that extends from a first end 18 to a second end 20, with the base wall 16 also extending from a first side 22 to a second side 24. The base wall 16 of splice manager 10 also includes a first aperture 26 and a second aperture 28 extending therethrough.

Splice manager 10 also includes a first spool member 30 and a second spool member 32 extending from base wall 16. First spool member 30 includes a circular wall 31 that extends upwardly from base wall 16. In certain embodiments, first aperture 26 is positioned in the center of the circle defined by circular wall 31.

Second spool member 32 includes a first curved wall portion 34 and a second curved wall portion 36. First and second curved wall portions 34, 36 each extend upwardly from base wall 16. First curved wall portion 34 is positioned proximal to the first end 18, and extends from a position that is proximal to first side 22 and first end 18 to a position that is proximal to second side 24 and first end 18. Second curved wall portion 36 is positioned proximal to the second end 20, and extends from a position that is proximal to first side 22 and second end 20 to a position that is proximal to second side 24 and second end 20. It is noted that first and second curved wall portions 34, 36 are not continuous with one another, thereby allowing cables 14A, 14B to travel to the internal region of splice manager 10.

It is noted that walls 31, 34, 36 also can include tab members 38 extending therefrom for cable management purposes.

As shown in FIG. 1, splice manager 10 also includes curved guide walls 40 extending from base wall 16, with a first plurality 41 of guide walls 40 (e.g., six guide walls 40) extending upwardly from base wall 16 proximal to first side 22, and a second plurality 43 of guide walls 40 (e.g., six guide walls 40) extending upwardly from base wall 16 proximal to second side 24.

Positioned between the first and second pluralities 41, 43 of walls 40 is a plurality 45 of splice holders 42 (e.g., six splice holders 42). In exemplary embodiments, each splice holder 42 is configured and dimensioned to hold two splice protection sleeve assemblies 44. Thus, exemplary plurality 45 of splice holders 42 can hold twelve splice protection sleeve assemblies 44.

It is noted that the plurality 45 of splice holders 42 may or may not be integral to the base wall 16 (e.g., the plurality 45 of splice holders 42 may be removably mountable to the base wall 16).

As noted, splice manager 10 can be removably mounted to assembly housing 12 (e.g., splice cassette 12). In an embodiment, first protrusion 46 (e.g., cylindrical protrusion 46) of assembly housing 12 is inserted through first aperture 26 of splice manager 10, and second protrusion 48 (e.g., cylindrical protrusion 48) of assembly housing 12 is inserted through second aperture 28 of splice manager 10 to removably mount splice manager 10 to housing 12.

As such, the splice manager 10 is removable from the assembly housing 12 by moving the splice manager 10 until the first and second protrusions 46, 48 are no longer positioned in the first and second apertures 26, 28 (FIG. 1).

When the splice manager 10 is not mounted to the housing 12, this advantageously allows for the fusion splicing of the optical fibers 14A, 14B to be performed out in the open (e.g., away from housing 12), and then allows the fiber slack/excess 14B from the input trunk/harness cable 50 to be spooled around the second spool member 32 (e.g., around walls 34, 36) and allows the fiber slack/excess 14A from the fiber harness from the connector members 52 of the splice cassette housing 12 to be spooled around the first spool member 30 (e.g., around wall 31). As such, the fiber slack/excess 14A, 14B can be spooled independently of one another on a respective spool 30, 32 of splice manager 10.

After spooling the fiber slack/excess 14A, 14B on a respective spool 30, 32, the splice manager 10 can be re-mounted to housing 12 via protrusions 46, 48 positioned in apertures 26, 28 (e.g., with splice manager 10 mounted/positioned neatly within or into the rear enclosure space of the splice cassette 12—FIGS. 2 and 3).

As shown in FIGS. 2-3, splice protection sleeve assemblies 44 are mounted to respective splice holders 42, and fiber cables 14A are positioned within/between respective walls 40 of the first plurality 41 to control fiber 14A bend from the holders 42 to the first spool 30, and fiber cables 14B are positioned within/between respective walls 40 of the second plurality 43 to control fiber 14B bend from the holders 42 to the second spool 32.

As such and as shown in FIGS. 2-3, fibers 14A can travel from a respective connector assembly 52 and around wall 31 of spool 30 one or more times (e.g., in a clockwise fashion when viewing FIG. 2), and then within/between respective walls 40 of the first plurality 41 to a respective splice protection sleeve assembly 44 held by a respective holder 42.

Similarly, fibers 14B from cable 50 and/or cable 50 can travel around wall portion 34 of spool 32 and then around wall portion 36 of spool 32 one or more times (e.g., in a counter-clockwise fashion when viewing FIG. 2), and then fibers 14B can travel within/between respective walls 40 of the second plurality 43 to a respective splice protection sleeve assembly 44 held by a respective holder 42.

In other embodiments, it is also noted that fibers 14A, 14B can travel around spools 30 and/or 32 in a variety of different ways and different directions, as desired by a user.

As shown in FIGS. 1-2, the circular wall 31 of the first spool member 30 is positioned within or inside of the wall portions 34, 36 of the second spool member 32, with the wall portions 34, 36 of the second spool member 32 extending substantially around the outer periphery of the base wall 16 of splice manager 10 (with portion 34 extending from a position that is proximal to first side 22 and first end 18 to a position that is proximal to second side 24 and first end 18, and with portion 36 extending from a position that is proximal to first side 22 and second end 20 to a position that is proximal to second side 24 and second end 20).

Figure 4:
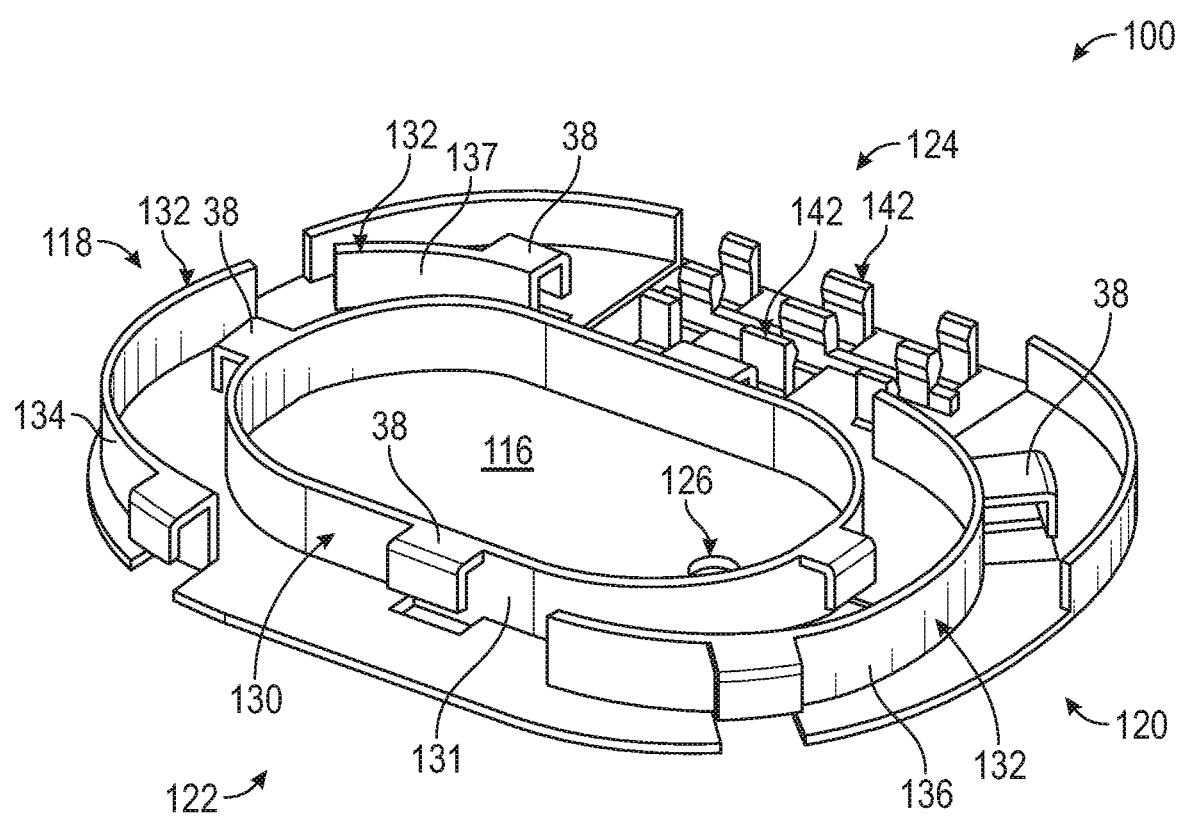
FIG. 4 is a top perspective view of another exemplary splice manager according to the present disclosure.
Figure 5:
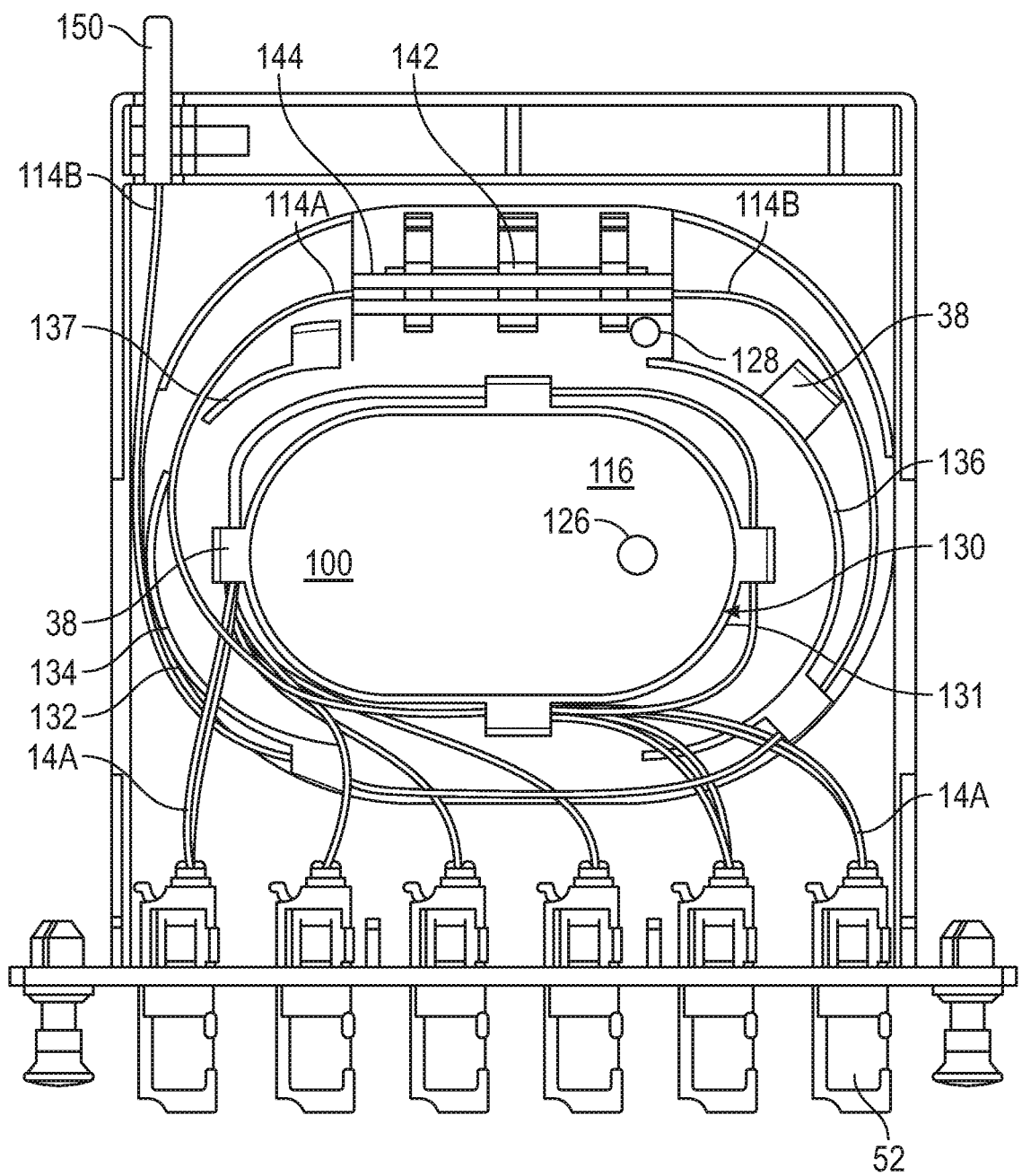
FIG. 5 is a top view of the splice manager of FIG. 4, the splice manager mounted to a splice cassette housing.
Figure 6:
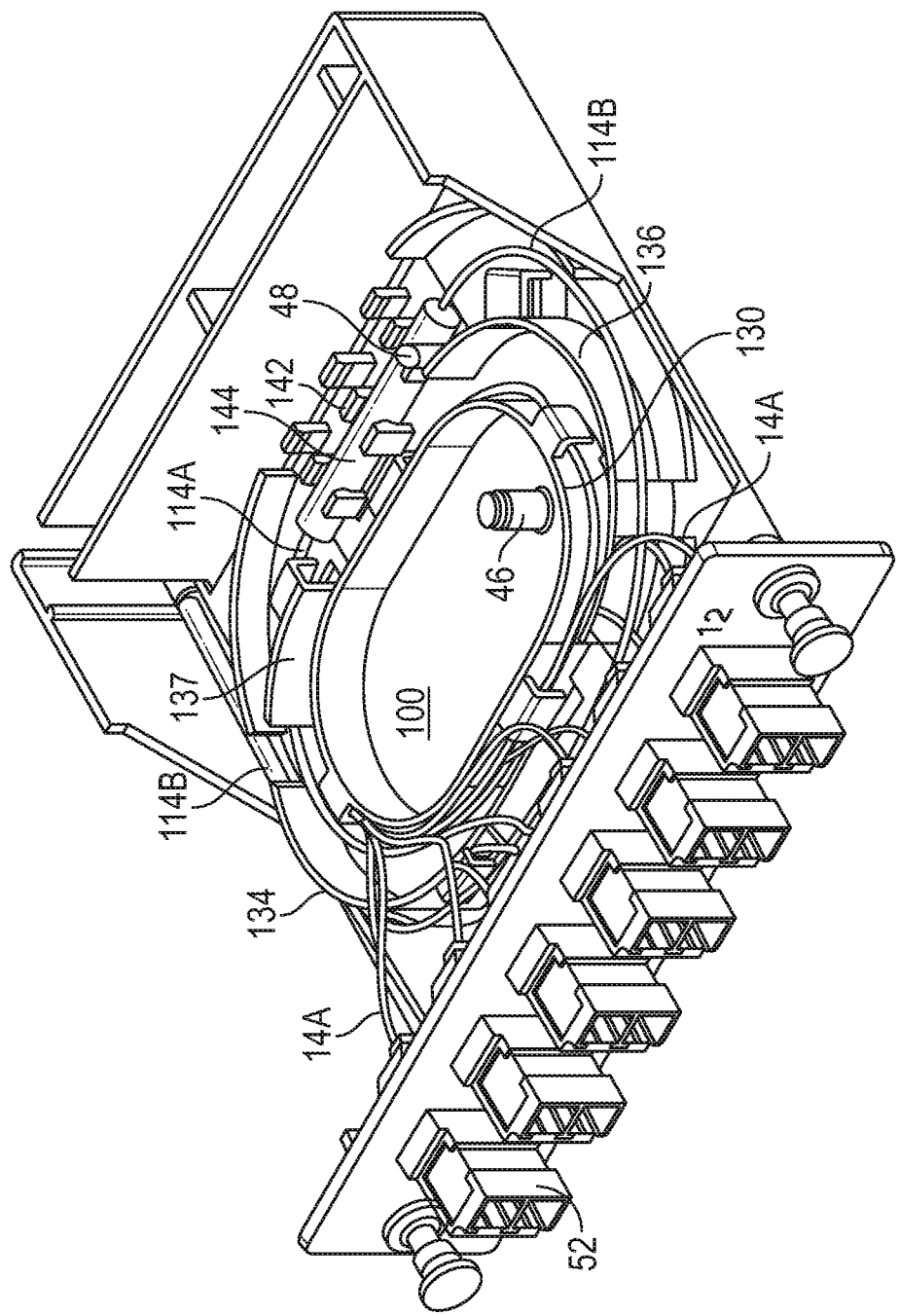
FIG. 6 is a top perspective view of the splice manager and splice cassette housing of FIG. 5.

With reference to FIGS. 4-6, there is illustrated another embodiment of an exemplary splice manager 100 according to the present disclosure. In general, splice manager 100 is configured and dimensioned to hold, house and store optical fiber cables 14A, 114A, 114B (e.g., single-fiber optical cables 14A and/or ribbon-fiber optical cables 114A, 114B).

In general, splice manager 100 is configured to be removably mounted with respect to assembly housing 12. As shown in FIGS. 5-6, exemplary assembly housing 12 takes the form of a splice cassette 12 or the like, although the present disclosure is not limited thereto. As shown in FIGS. 5-6, splice manager 100 can be mounted and positioned neatly within or into the enclosure space (e.g., rear enclosure space) of the splice cassette 12.

As shown in FIG. 4, exemplary splice manager 100 includes a base wall 116 that extends from a first end 118 to a second end 120, with the base wall 116 also extending from a first side 122 to a second side 124. The base wall 116 of splice manager 100 also includes a first aperture 126 and a second aperture 128 extending therethrough (FIG. 5).

Splice manager 100 also includes a first spool member 130 and a second spool member 132 extending from base wall 116. First spool member 130 includes oval or elliptical wall 131 that extends upwardly from base wall 116. In certain embodiments, first aperture 126 is positioned within the oval or ellipse defined by oval/elliptical wall 131.

Second spool member 132 includes a first curved wall portion 134, a second curved wall portion 136, and a third curved wall portion 137. First, second and third curved wall portions 134, 136, 137 each extend upwardly from base wall 116. First curved wall portion 134 is positioned proximal to the first end 118, and extends from a position that is proximal to first side 122 and first end 118 to a position that is proximal to first end 118. Second curved wall portion 136 is positioned proximal to the second end 120, and extends from a position that is proximal to first side 122 and second end 120 to a position that is proximal to second side 124 and second end 120. Third curved wall portion 137 is positioned proximal to the first end 118, and extends from a position that is proximal to second side 124 and first end 118 to a position that is proximal to first end 118.

It is noted that first, second and third curved wall portions 134, 136, 137 are not continuous with one another, thereby allowing cables 14A, 114A, 114B to travel to the internal region of splice manager 100.

It is noted that walls 131, 134, 136, 137 also can include tab members 38 extending therefrom for cable management purposes.

Positioned near second side 124 is one or more splice holders 142 (e.g., two splice holders 142). In exemplary embodiments, each splice holder 142 is configured and dimensioned to hold a splice protection sleeve assembly 144 (e.g., a splice protection sleeve assembly 144 for mass or ribbon fusion splicing). It is noted that splice holders 142 may or may not be integral to the base wall 116 (e.g., the splice holders 142 may be removably mountable to the base wall 116).

As noted, splice manager 100 can be removably mounted to assembly housing 12 (e.g., splice cassette 12). In an embodiment, first protrusion 46 (e.g., cylindrical protrusion 46) of assembly housing 12 is inserted through first aperture 126 of splice manager 100, and second protrusion 48 (e.g., cylindrical protrusion 48) of assembly housing 12 is inserted through second aperture 128 of splice manager 100 to removably mount splice manager 100 to housing 12.

As such, the splice manager 100 is removable from the assembly housing 12 by moving the splice manager 100 until the first and second protrusions 46, 48 are no longer positioned in the first and second apertures 126, 128 (FIG. 4).

When the splice manager 100 is not mounted to the housing 12, this advantageously allows for the fusion splicing of the optical fibers 114A, 114B to be performed out in the open (e.g., away from housing 12), and then allows the fiber slack/excess 114B from the input trunk/harness cable 150 to be spooled around the second spool member 32 (e.g., around walls 134, 136 and/or 137) and allows the fiber slack/excess 14A, 114A from the fiber harness from the connector members 52 of the housing 12 to be spooled around the first spool member 130 (e.g., around wall 131). As such, the fiber slack/excess 14A/114A and 114B can be spooled independently of one another on a respective spool 130, 132 of splice manager 100.

After spooling the fiber slack/excess 14A/114A, 14B on a respective spool 130, 132, the splice manager 100 can be re-mounted to housing 12 via protrusions 46, 48 positioned in apertures 126, 128 (e.g., with splice manager 100 mounted/positioned neatly within or into the rear enclosure space of the splice cassette 12—FIGS. 5 and 6).

As shown in FIGS. 5-6, splice protection sleeve assembly 144 is mounted to a splice holder 142, and fiber cable 114A extends from the assembly 144 to the first spool 130, and fiber cable 114B extends from the assembly 144 to the second spool 132.

As such and as shown in FIGS. 5-6, fibers 14A can travel from a respective connector assembly 52 to wall 131, and then fibers 14A/114A can travel around wall 131 of spool 130 one or more times (e.g., in a clockwise fashion when viewing FIG. 5), and then to a respective splice protection sleeve assembly 144 held by a respective holder 142.

Similarly, fibers 114B from cable 150 and/or cable 150 can travel around wall portion 134 of spool 132 and then around wall portion 136 of spool 132 and then directly to assembly 144, or fibers 114B from cable 150 and/or cable 150 can travel around wall portion 134 and then around wall portion 136 and then around wall portion 137 of spool 132 one or more times (e.g., in a counter-clockwise fashion when viewing FIG. 5) and then eventually to assembly 144.

In other embodiments, it is also noted that fibers 14A, 114A, 114B can travel around spools 130 and/or 132 in a variety of different ways and different directions, as desired by a user.

As shown in FIGS. 4-5, the oval or elliptical wall 131 of the first spool member 130 is positioned within or inside of the wall portions 134, 136, 137 of the second spool member 132, with portions of the wall portions 134, 136 of the second spool member 132 extending substantially near the outer periphery of the base wall 116.

In exemplary embodiments, the ellipse or oval defined by first spool 130 is substantially concentric with the ellipse or oval defined by second spool 132 (e.g., the ellipse/oval defined by wall 131 is positioned substantially concentrically within the ellipse/oval defined by walls 134, 136, 137).

Figure 7:
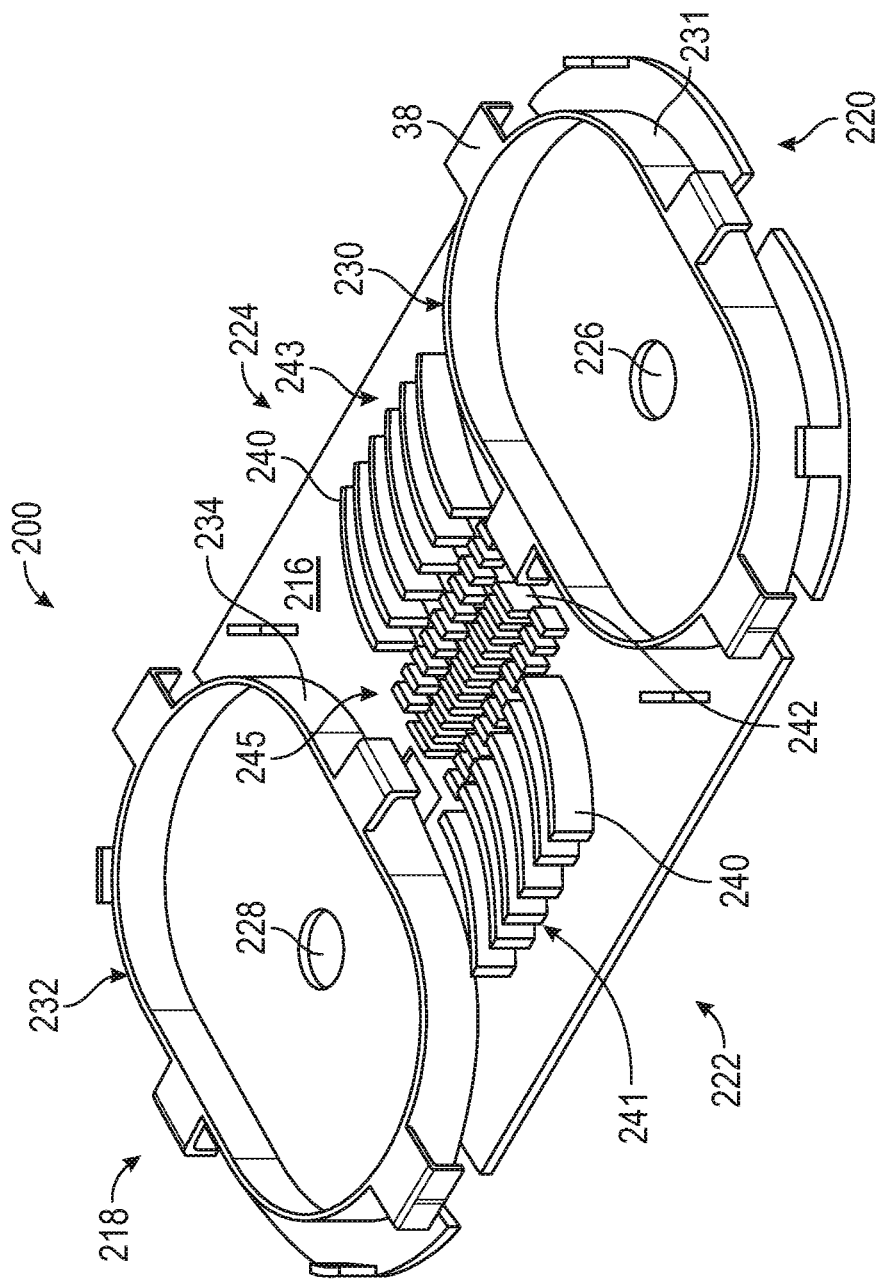
FIG. 7 is a top perspective view of another exemplary splice manager according to the present disclosure.
Figure 8:
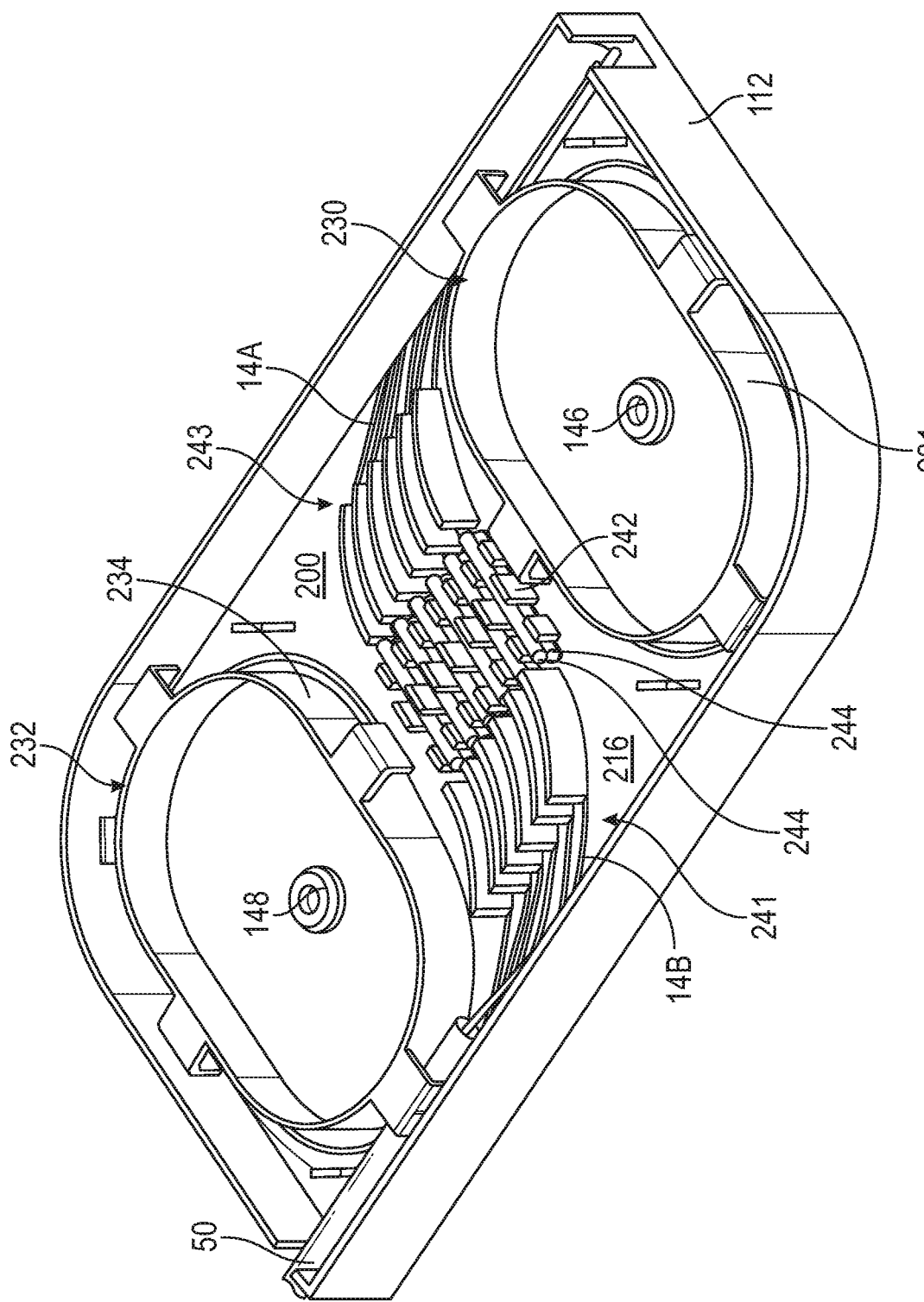
FIG. 8 is a top perspective view of the splice manager of FIG. 7, the splice manager mounted to a splice tray housing.

With reference to FIGS. 7-8, there is depicted another embodiment of an exemplary splice manager 200 according to the present disclosure. In general, splice manager 200 is configured and dimensioned to hold, house and store optical fiber cables 14A, 14B (e.g., single-fiber optical cables 14A, 14B). Splice manager 200 is configured to be removably mounted with respect to assembly housing 112. As shown in FIG. 8, exemplary assembly housing 112 takes the form of a splice tray 112 or the like, although the present disclosure is not limited thereto. Rather, housing 112 can take a variety of forms/designs (e.g. splice cassette, etc.). As shown in FIG. 8, splice manager 200 can be mounted and positioned neatly within or into the enclosure space of the splice tray 112.

As shown in FIG. 7, exemplary splice manager 200 includes a base wall 216 that extends from a first end 218 to a second end 220, with the base wall 216 also extending from a first side 222 to a second side 224. The base wall 216 of splice manager 200 also includes a first aperture 226 and a second aperture 228 extending therethrough.

Splice manager 200 also includes a first spool member 230 and a second spool member 232 extending from base wall 216. First spool member 230 includes oval or elliptical wall 231 that extends upwardly from base wall 216. In certain embodiments, first aperture 226 is positioned within the oval or ellipse defined by oval/elliptical wall 231.

Second spool member 232 includes oval or elliptical wall 234 that extends upwardly from base wall 216. In certain embodiments, second aperture 228 is positioned within the oval or ellipse defined by oval/elliptical wall 234. In some embodiments, members 230, 232 are mirror images of one another. Spool member 230 is positioned proximal to second end 220, and spool member 232 is positioned proximal to first end 218. It is noted that walls 231, 234, also can include tab members 38 extending therefrom for cable management purposes.

As shown in FIG. 7, splice manager 200 also includes curved guide walls 240 extending from base wall 216, with a first plurality 241 of guide walls 240 (e.g., six guide walls 240) extending upwardly from base wall 216 proximal to first side 222, and a second plurality 243 of guide walls 240 (e.g., six guide walls 240) extending upwardly from base wall 216 proximal to second side 224.

Positioned between the first and second pluralities 241, 243 of walls 240 is a plurality 245 of splice holders 242 (e.g., six splice holders 242). In exemplary embodiments, each splice holder 242 is configured and dimensioned to hold two splice protection sleeve assemblies 244. Thus, exemplary plurality 245 of splice holders 242 can hold twelve splice protection sleeve assemblies 244.

It is noted that the plurality 245 of splice holders 242 may or may not be integral to the base wall 216 (e.g., the plurality 245 of splice holders 242 may be removably mountable to the base wall 216).

As noted, splice manager 200 can be removably mounted to assembly housing 112 (e.g., splice tray 112). In an embodiment, first protrusion 146 (e.g., cylindrical protrusion 146) of assembly housing 112 is inserted through first aperture 226 of splice manager 200, and second protrusion 148 (e.g., cylindrical protrusion 148) of assembly housing 112 is inserted through second aperture 228 of splice manager 200 to removably mount splice manager 200 to housing 112.

As such, the splice manager 200 is removable from the assembly housing 112 by moving the splice manager 200 until the first and second protrusions 146, 148 are no longer positioned in the first and second apertures 226, 228 (FIG. 7).

When the splice manager 200 is not mounted to the housing 112, this advantageously allows for the fusion splicing of the optical fibers 14A, 14B to be performed out in the open (e.g., away from housing 112), and then allows the fiber slack/excess 14B from the input trunk/harness cable 50 to be spooled around the second spool member 232 (e.g., around wall 234) and allows the fiber slack/excess 14A from the fiber harness from the connector members of the housing 112 to be spooled around the first spool member 230 (e.g., around wall 231). As such, the fiber slack/excess 14A, 14B can be spooled independently of one another on a respective spool 230, 232 of splice manager 200.

After spooling the fiber slack/excess 14A, 14B on a respective spool 230, 232, the splice manager 200 can be re-mounted to housing 112 via protrusions 146, 148 positioned in apertures 226, 228 (e.g., with splice manager 200 mounted/positioned neatly within or into the enclosure space of the splice tray 112—FIG. 8).

As shown in FIG. 8, splice protection sleeve assemblies 244 are mounted to respective splice holders 242, and fiber cables 14A are positioned within/between respective walls 240 of the second plurality 243 to control fiber 14A bend from the holders 242 to the first spool 230, and fiber cables 14B are positioned within/between respective walls 240 of the first plurality 241 to control fiber 14B bend from the holders 242 to the second spool 232.

As such and as shown in FIG. 8, fibers 14A can travel from a respective connector assembly and around wall 231 of spool 230 one or more times (e.g., in a counter-clockwise fashion when viewing FIG. 8), and then within/between respective walls 240 of the second plurality 243 to a respective splice protection sleeve assembly 244 held by a respective holder 242.

Similarly, fibers 14B from cable 50 and/or cable 50 can travel around wall 234 of spool 232 one or more times (e.g., in a counter-clockwise fashion when viewing FIG. 8), and then fibers 14B can travel within/between respective walls 240 of the first plurality 241 to a respective splice protection sleeve assembly 244 held by a respective holder 242. In other embodiments, it is also noted that fibers 14A, 14B can travel around spools 230 and/or 232 in a variety of different ways and different directions, as desired by a user.

Figure 9:
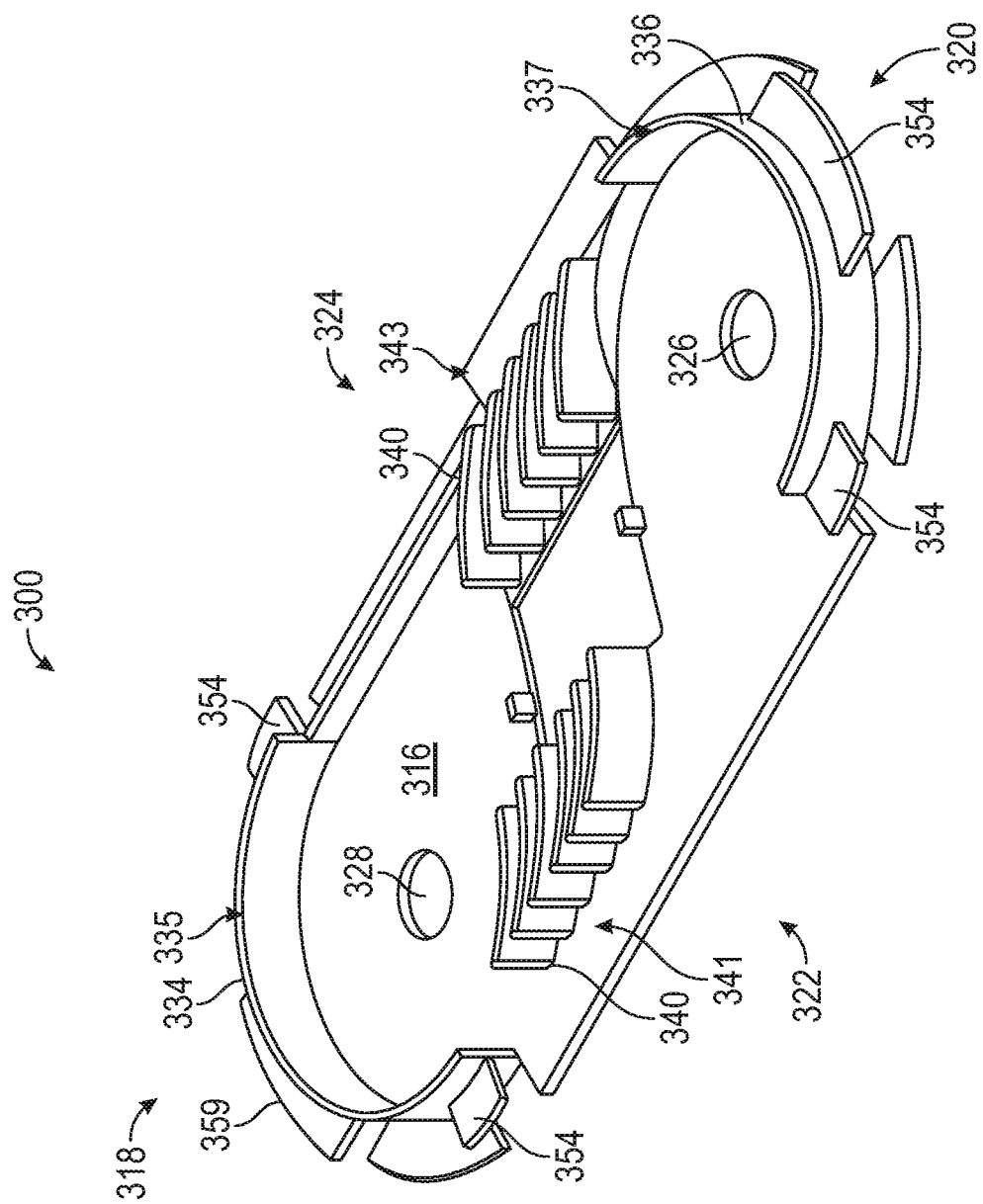
FIG. 9 is a top perspective view of another exemplary splice manager according to the present disclosure.
Figure 10:
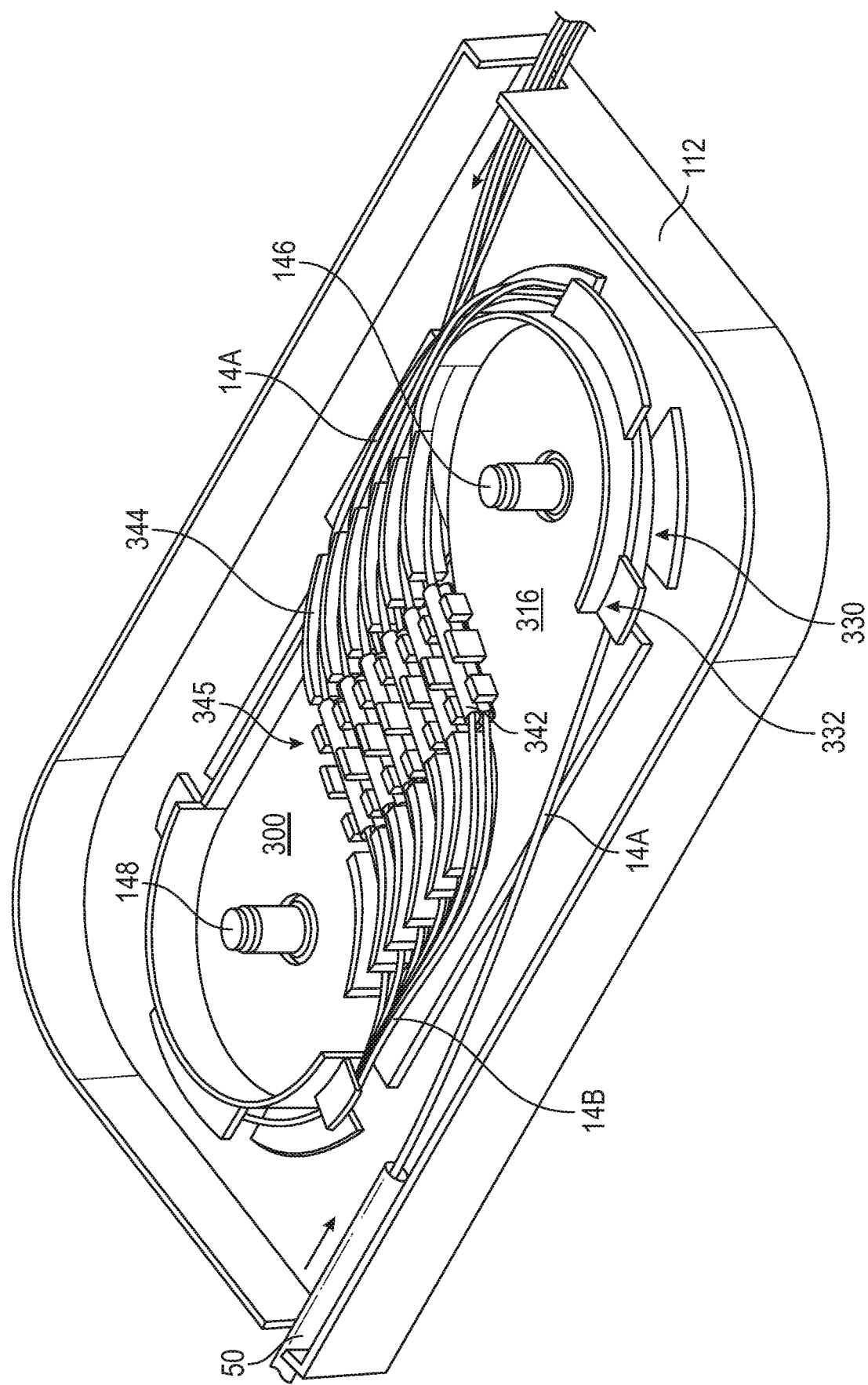
FIG. 10 is a top perspective view of the splice manager of FIG. 9, the splice manager mounted to a splice tray housing.

With reference to FIGS. 9-10, there is illustrated another embodiment of an exemplary splice manager 300 according to the present disclosure. In general, splice manager 300 is configured and dimensioned to hold, house and store optical fiber cables 14A, 14B (e.g., single-fiber optical cables 14A, 14B). Splice manager 300 is configured to be removably mounted with respect to assembly housing 112 (e.g., splice tray 112 or the like).

As shown in FIG. 9, exemplary splice manager 300 includes a base wall 316 that extends from a first end 318 to a second end 320, with the base wall 316 also extending from a first side 322 to a second side 324. The base wall 316 of splice manager 300 also includes a first aperture 326 and a second aperture 328 extending therethrough.

Splice manager 300 also includes a first curved wall portion 334 and a second curved wall portion 336. First and second curved wall portions 334, 336 each extend upwardly from base wall 316. First curved wall portion 334 is positioned proximal to the first end 318, and extends from a position that is proximal to first side 322 and first end 318 to a position that is proximal to second side 324 and first end 318. Second curved wall portion 336 is positioned proximal to the second end 320, and extends from a position that is proximal to first side 322 and second end 320 to a position that is proximal to second side 324 and second end 320. It is noted that first and second curved wall portions 334, 336 are not continuous with one another, thereby allowing cables 14A, 14B to travel to the internal region of splice manager 300.

First and second curved wall portions 334, 336 include one or more planar divider layer members 354. First spool member 330 of splice manager 300 is defined by the area of walls 334, 336 that extend from base wall 316 to the bottom of the divider layer members 354. Second spool member 332 of splice manager 300 is defined by the area of walls 334, 336 that extend from the top of divider layer members 354 to the top surfaces 335, 337 of walls 334, 336.

As shown in FIG. 9, splice manager 300 also includes curved guide walls 340 extending from base wall 316, with a first plurality 341 of guide walls 340 (e.g., six guide walls 340) extending upwardly from base wall 316 proximal to first side 322, and a second plurality 343 of guide walls 340 (e.g., six guide walls 340) extending upwardly from base wall 316 proximal to second side 324.

Positioned between the first and second pluralities 341, 343 of walls 340 is a plurality 345 of splice holders 342 (e.g., six splice holders 342). In exemplary embodiments, each splice holder 342 is configured and dimensioned to hold two splice protection sleeve assemblies 344. Thus, exemplary plurality 345 of splice holders 342 can hold twelve splice protection sleeve assemblies 344.

It is noted that the plurality 345 of splice holders 432 may or may not be integral to the base wall 316 (e.g., the plurality 345 of splice holders 342 may be removably mountable to the base wall 316).

As noted, splice manager 300 can be removably mounted to assembly housing 112 (e.g., splice tray 112). In an embodiment, first protrusion 146 (e.g., cylindrical protrusion 146) of assembly housing 112 is inserted through first aperture 326 of splice manager 300, and second protrusion 148 (e.g., cylindrical protrusion 148) of assembly housing 112 is inserted through second aperture 328 of splice manager 300 to removably mount splice manager 300 to housing 112.

As such, the splice manager 300 is removable from the assembly housing 112 by moving the splice manager 300 until the first and second protrusions 146, 148 are no longer positioned in the first and second apertures 326, 328 (FIG. 9).

When the splice manager 300 is not mounted to the housing 112, this advantageously allows for the fusion splicing of the optical fibers 14A, 14B to be performed out in the open (e.g., away from housing 112), and then allows the fiber slack/excess 14B from the input trunk/harness cable 50 to be spooled around the first or second spool member 330, 332 (e.g., around walls 334, 336 above or below the members 354) and allows the fiber slack/excess 14A from the fiber harness from the connector members of the assembly housing 112 to be spooled around the first or second spool member 30 (e.g., around walls 334, 336 above or below the members 354). As such, the fiber slack/excess 14A, 14B can be spooled independently of one another on a respective spool 330, 332 of splice manager 300.

After spooling the fiber slack/excess 14A, 14B on a respective spool 330, 332, the splice manager 300 can be re-mounted to housing 112 via protrusions 146, 148 positioned in apertures 326, 328 (e.g., with splice manager 300 mounted/positioned neatly within or into the enclosure space of the splice tray 112—FIG. 10).

In one embodiment and as shown in FIG. 10, splice protection sleeve assemblies 344 are mounted to respective splice holders 342, and fiber cables 14A are positioned within/between respective walls 340 of the second plurality 343 to control fiber 14A bend from the holders 342 to the second spool 332, and fiber cables 14B are positioned within/between respective walls 340 of the first plurality 341 to control fiber 14B bend from the holders 342 to the first spool 30. In other embodiments, it is also noted that fibers 14A, 14B can travel around spools 330 and/or 332 (and pluralities 341, 343) in a variety of different ways and different directions, as desired by a user.

As such and as shown in FIG. 10, fibers 14A can travel from a respective connector assembly and around spool 332 (or spool 330) one or more times (e.g., in a counter-clockwise fashion when viewing FIG. 10), and then within/between respective walls 340 to a respective splice protection sleeve assembly 344 held by a respective holder 342.

Similarly, fibers 14B from cable 50 and/or cable 50 can travel around spool 330 (or spool 332) one or more times (e.g., in a counter-clockwise fashion when viewing FIG. 10), and then fibers 14B can travel within/between respective walls 340 to a respective splice protection sleeve assembly 344 held by a respective holder 342.

There are several advantages to splice managers 10, 100, 200, 300, a first advantage being space required, and a second being facilitation of the splicing process. The presence of two distinct spool tracks (e.g., spool 30 and 32) enables that substantially all fiber 14A, 14B slack/excess required to be housed within the cassette 12 or splice tray 112 which ultimately houses the splice manager 10, 100, 200, 300. In exemplary embodiments, no external spools are required, greatly diminishing the need for external cable management, and generally allowing fusion splicing to take place and be contained within a smaller footprint than was previously practicable utilizing conventional systems.

Moreover and with conventional systems, if a technician were asked to place the individual splices directly into the cassette/housing as they were performed, it would be very difficult to avoid damage to the unprotected fiber typically found on a cassette harness. However, since the exemplary splice manager (10, 100, 200, 300) of the present disclosure is removable, splicing can take place in an open area, spooled up and routed, and simply dropped into the housing (cassette/tray). In other words, these exemplary splice managers (10, 100, 200, 300) not only allow the assembly housing (splice cassettes 12 and splice trays 112) to be more compact, they also dispense with the need for external supporting spools, and also make the process of splicing simpler and easier for those who employ it.

Conventional systems differ from the exemplary splice managers (10, 100, 200, 300) in many respects. For example, it is noted that some conventional systems have a tray that includes only one spool, which is intended not to store the full fiber slack, but instead just enough to re-do a splice, and route it into the shorter path nearby. As such, external slack storage would still be necessary. Moreover, it is noted that some conventional systems utilize a tray that is one integral piece, which would not allow the splicing to be performed in an open area, as the exemplary splice managers (10, 100, 200, 300) of the present disclosure would allow.

As shown in FIGS. 11-17, the present disclosure also provides for a carrier tube 56 and a gripping member 58 for pre-cleaved fibers 14A (or 114A, or 14B).

Figure 14:
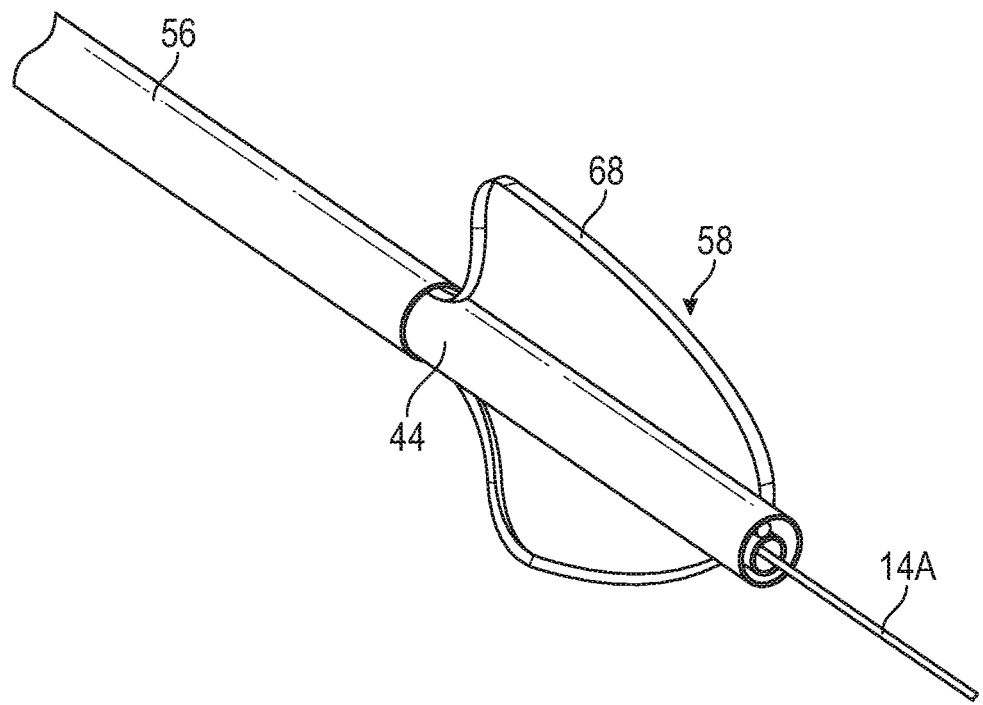
FIG. 14 is a side perspective view of FIG. 13, with the gripping member and end of the optical fiber and end of the protective sleeve assembly inserted into an exemplary carrier tube.
Figure 15:
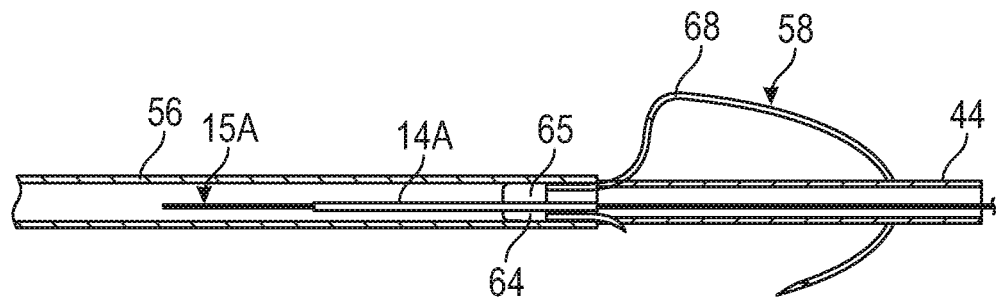
FIG. 15 is a sectioned side view of the assembly of FIG. 14.

In exemplary embodiments and as shown in FIGS. 14-15, the carrier tube 56 is configured to hold/house the cleaved end of fiber 14A (or cleaved ends of fiber 114A), thereby ensuring no contact with other surfaces, as well as (potentially) the splice protection sleeve 44. As such, by having the ends pre-cleaved, and the splice protection sleeves 44 already routed on their respective fibers/ribbons, the field technician doing the actual splicing can save time, and reduce the risk of certain errors, such as splicing the fibers without having a protection sleeve 44 in place.

Figure 11:
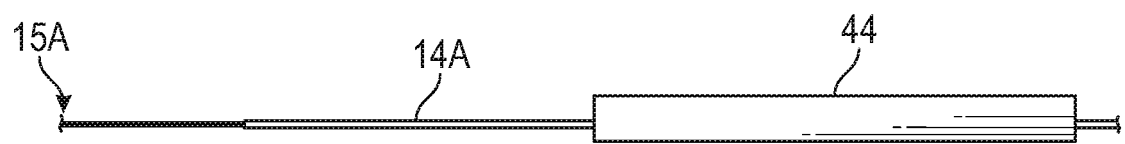
FIG. 11 is a side view of an optical fiber and protective sleeve assembly.

FIG. 11 depicts a cleaved end 15A of optical fiber 14A, with the sleeve assembly 44 positioned over fiber 14A. The optical fiber 14A is stripped, then cleaved at end 15A, and this cleaved end 15A needs to be protected during shipping and handling, which allows the installer to avoid having to do this preparatory work in the field.

In exemplary embodiments and as discussed further below, the cleaved end 15A is protected within a rigid carrier tube 56, and held in place by means of a molded gripping member 58, with the requisite protective sleeve 44 already on the still-coated portion of the fiber 14A (FIGS. 14-15). Exemplary carrier tube 56 can be fabricated from a rigid plastic (delrin, nylon, etc.) or from metal or the like.

Figure 12:
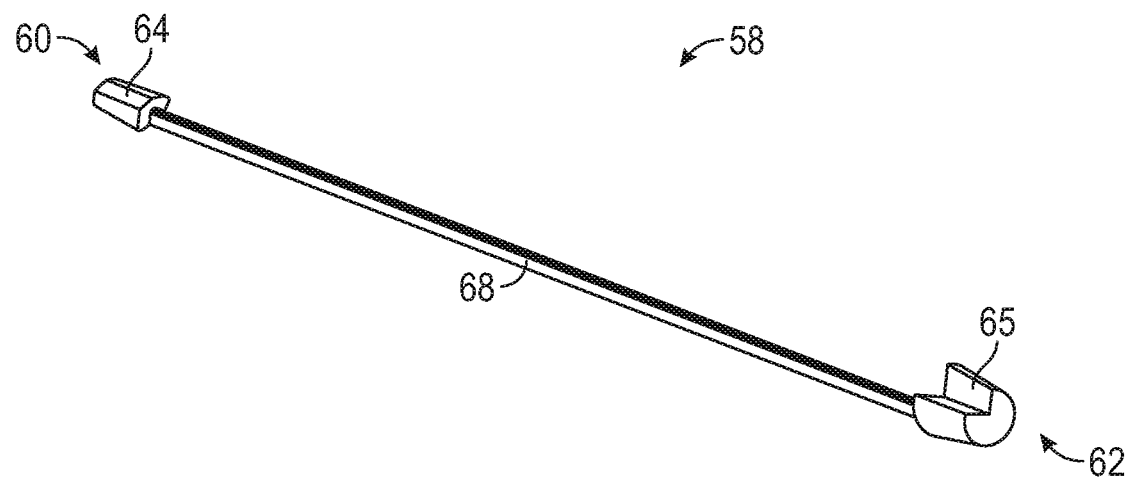
FIG. 12 is a side view of an exemplary gripping member.

FIG. 12 depicts an exemplary gripping member 58. Gripping member 58 extends from a first end 60 to a second end 62, the first end 60 having a first grip portion 64 and the second end having a second grip portion 65.

Figure 13:
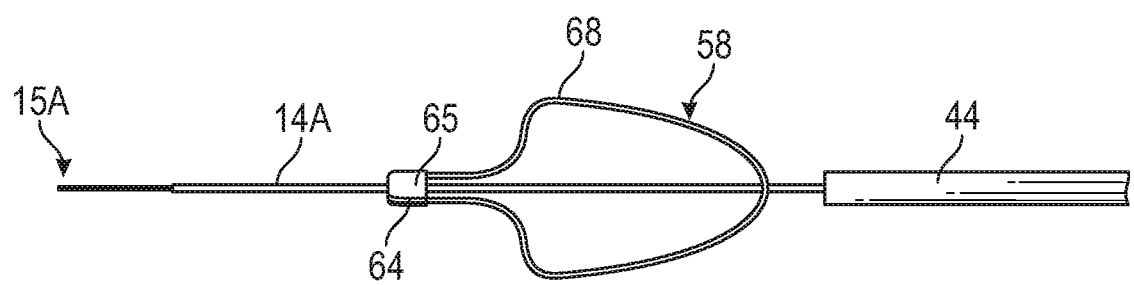
FIG. 13 is a side view FIG. 11 with the gripping member attached.

In exemplary embodiments, gripping member 58 is fabricated or molded from a soft, low-friction thermoplastic (e.g., a polypropylene or polyethylene). As shown in FIGS. 12-13, the long, thin middle section 68 of gripping member 58 is configured to be flexed, thereby allowing the grip portions 64, 65 to fit together as a v-groove gripping the fiber 14A (FIG. 13) and then inserted into the carrier tube 56 (FIGS. 14-15).

FIG. 13 depicts the gripping member 58 folded over and around the fiber 14A to hold the fiber 14A gently and securely. The protective sleeve 44 can be further up the fiber 14A until the grip portions 64, 65 of gripping member 58 have been inserted into the carrier tube 56. The carrier tube 56 prevents the grip portions 64, 65 from opening up, and thus the fiber 14A is held stationary with the cleaved end 15A of the fiber 14A securely located within the carrier tube 56—FIGS. 14-15.

As shown in FIG. 14, the middle section 68 thus forms a pull ring, enabling the installer to remove the gripping member 58 from carrier tube 56 quickly and easily, when desired. A slight interference condition can exist between grip portions 64, 65 and the carrier tube 56, as well as between the grip portions 64, 65 and the protective sleeve 44, making it easy to hold the otherwise vulnerable cleaved fiber end 15A secure in place during shipment. After use, the gripping member 58 and the carrier tube 56 could be discarded.

Figure 16:
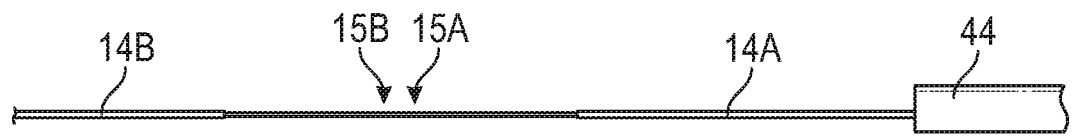
FIG. 16 is a side view of two cleaved optical fibers.

FIG. 11 also depicts the fiber 14A and sleeve assembly 44 after they are removed from carrier tube 56, and after gripping member 58 is removed. FIG. 16 then depicts fiber 14A positioned next to cleaved end 15B of fiber 14B for splicing.

It is noted that the protective sleeve 44 is on the right side of FIG. 16, which can sometimes be forgotten in the field, but which will be in place ahead of time according to the systems and methods of the present disclosure. Next, these fibers 14A, 14B can be placed into a fusion splicer, which can ensure proper spacing and alignment. The two fibers 14A, 14B can be spliced by means of a high-voltage electrical arc, which melts the ends 15A, 15B of the fibers 14A, 14B and fuses them together. Next and as shown in FIG. 17, the protective sleeve 44 can be moved or slid over the resultant splice, then shrunk in place to protect what would otherwise be bare glass.

Figure 17:
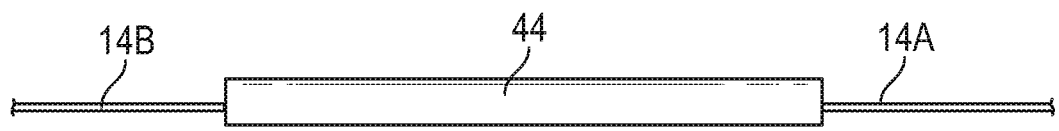
FIG. 17 is a side view of the fibers of FIG. 16, after splicing and after moving and shrinking the protective sleeve assembly over the spliced fibers.

As shown in FIG. 17, the fiber 14A, 14B on each side of the splice will be the coated portion of the fiber 14A, 14B, and all of the stripped (bare glass) fiber on both the harness 14A and the trunk fibers 14B will be covered by the protective sleeve 44. In exemplary embodiments, each protective sleeve 44 has a strength member (e.g., a thin steel rod) to prevent the splice from bending. Once shrunk in place, the protective sleeve 44 is ready to snap into a splice holder 42 which is part of the splice manager 10 (or splice holders of splice manager 100, 200, 300).

It is noted that some conventional products rely exclusively on the installer to prepare the fibers for splicing, which includes the steps of feeding the protective sleeve on to the fiber, and then stripping and cleaving both fibers before splicing. However and with exemplary gripping member 58 and carrier tube 56, a user would just need to strip and cleave the trunk fiber 14B, but more than half of that preparatory work would be done for them (e.g., for fibers 14A), thereby advantageously saving them considerable time.

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

The invention claimed is:

1. A splice manager, comprising:
    a base wall that extends from a first end to a second end and that extends from a first side to a second side, the base wall including a first spool member, a second spool member, and one or more splice holders;
    wherein the base wall is configured to be removably mounted to a housing;
    wherein when the base wall is not mounted to the housing, this allows for the fusion splicing of a plurality of optical fibers to be performed out in the open and away from the housing, and then allows the fiber slack from an input cable to be spooled around the outside of the second spool member and allows the fiber slack from a fiber harness from the housing to be spooled around the outside of the first spool member,
    wherein the first spool member is formed by a first circular, oval or elliptical wall, the first circular, oval or elliptical wall is a single, continuous wall defining a complete circle, oval or ellipse;
    wherein the second spool member is formed by one or more curved wall portions;
    wherein at least one splice protection sleeve assembly of spliced optical fibers is positioned in the one or more splice holders; and
    wherein after spooling the fiber slack around the outside of the respective first and second spool members, the base wall is configured to be re-mounted to the housing.

2. The splice manager of claim 1, wherein the housing is a splice cassette or a splice tray.

3. The splice manager of claim 1, wherein the base wall includes a first aperture and a second aperture extending therethrough; and
    wherein the housing includes a first protrusion and a second protrusion, the first protrusion configured to be inserted through the first aperture, and the second protrusion configured to be inserted through the second aperture to removably mount the base wall to the housing.

4. The splice manager of claim 1, wherein the first circular, oval or elliptical wall of the first spool member extends upwardly from the base wall; and
    wherein the one or more curved wall portions of the second spool member include a first curved wall portion and a second curved wall portion, the first and second curved wall portions each extending upwardly from the base wall.

5. The splice manager of claim 4, wherein the first curved wall portion is positioned proximal to the first end, and extends from a position that is proximal to the first side and the first end to a position that is proximal to the second side and the first end; and
    wherein the second curved wall portion is positioned proximal to the second end, and extends from a position that is proximal to the first side and the second end to a position that is proximal to the second side and the second end.

6. The splice manager of claim 4, wherein the first circular, oval or elliptical wall of the first spool member is positioned within or inside of the first and second curved wall portions of the second spool member, with the first and second curved wall portions of the second spool member extending substantially around the outer periphery of the base wall.

7. The splice manager of claim 1, further comprising curved guide walls extending from the base wall, with a first plurality of curved guide walls extending upwardly from the base wall proximal to the first side, and a second plurality of curved guide walls extending upwardly from the base wall proximal to second side.

8. The splice manager of claim 7, wherein the one or more splice holders are positioned between the first and second pluralities of curved guide walls.

9. The splice manager of claim 1, wherein each splice holder of the one or more splice holders is configured and dimensioned to hold two splice protection sleeve assemblies.

10. The splice manager of claim 1, wherein the first circular, oval or elliptical wall of the first spool member extends upwardly from the base wall; and
    wherein the one or more curved wall portions of the second spool member include a first curved wall portion, a second curved wall portion, and a third curved wall portion, the first, second and third curved wall portions each extending upwardly from the base wall.

11. The splice manager of claim 10, wherein the first curved wall portion is positioned proximal to the first end, and extends from a position that is proximal to the first side and the first end to a position that is proximal to the first end;
    wherein the second curved wall portion is positioned proximal to the second end, and extends from a position that is proximal to the first side and the second end to a position that is proximal to the second side and the second end; and
    wherein the third curved wall portion is positioned proximal to the first end, and extends from a position that is proximal to the second side and the first end to a position that is proximal to the first end.

12. The splice manager of claim 10, wherein the circular, oval or elliptical wall defined by first spool member is substantially concentric with an ellipse or oval defined by the one or more curved walls of the second spool member.

13. The splice manager of claim 1, wherein the first circular, oval or elliptical wall of the first spool member extends upwardly from the base wall; and
    wherein the one or more curved wall portions of the second spool member include an oval or elliptical wall that extends upwardly from the base wall.

14. The splice manager of claim 13, wherein the first spool member is positioned proximal to the second end, and the second spool member is positioned proximal to the first end.

15. The splice manager of claim 1, wherein the base wall includes a first curved wall portion and a second curved wall portion extending upwardly from the base wall, the first curved wall portion positioned proximal to the first end, and the second curved wall portion positioned proximal to the second end;

wherein the first and second curved wall portions include one or more planar divider layer members;

wherein the first spool member is defined by the area of the first and second curved wall portions that extend from the base wall to the bottom of the divider layer members; and wherein the second spool member is defined by the area of the first and second curved wall portions that extend from the top of divider layer members to the top surfaces of the first and second curved wall portions.

16. The splice manager of claim 1, wherein:

the first circular, oval or elliptical wall of the first spool member extends upwardly from the base wall;

the one or more curved wall portions of the second spool member extend upwardly from the base wall; and the first circular, oval or elliptical wall of the first spool member is positioned within or inside of the one or more curved wall portions of the second spool member.

17. The splice manager of claim 16, wherein the one or more curved wall portions of the second spool member extend substantially around the outer periphery of the base wall.

18. The splice manager of claim 1, wherein the fiber slack from the input cable is capable of being completely spooled around the outside of the one or more curved wall portions of the second spool member prior to directing the plurality of optical fibers to the one or more splice holders for the fusion splicing.

19. The splice manager of claim 1, wherein the one or more curved wall portions of the second spool member are formed by a second circular, oval or elliptical wall, and the second circular, oval or elliptical wall is capable of receiving the spooled fiber slack from the input cable completely around the outside of the second spool member along the second circular, oval or elliptical wall.

20. The splice manager of claim 1, wherein:

the first circular, oval or elliptical wall forming the first spool member is capable of receiving the spooled fiber slack from the fiber harness completely around the outside of the first spool member along the first circular, oval or elliptical wall; and the one or more curved wall portions forming the second spool member are capable of receiving the spooled fiber slack from the input cable completely around the outside of the second spool member along the one or more curved wall portions.

21. The splice manager of claim 1, wherein the one or more curved wall portions forming the second spool member are a single, continuous wall defining the outside of the second spool member.

22. A method for utilizing a splice manager, the method comprising:

providing a base wall that extends from a first end to a second end and that extends from a first side to a second side, the base wall including a first spool member, a second spool member, and one or more splice holders, wherein the first spool member is formed by a first circular, oval or elliptical wall, the first circular, oval or elliptical wall is a single, continuous wall defining a complete circle, oval or ellipse, and the second spool member is formed by one or more curved wall portions;

removably mounting the base wall to a housing;

removing the base wall from the housing;

fusion splicing a plurality of optical fibers out in the open and away from the housing;

spooling the fiber slack from an input cable around the outside of the second spool member and spooling the fiber slack from a fiber harness from the housing around the outside of the first spool member;

positioning at least one splice protection sleeve assembly of spliced optical fibers in the one or more splice holders; and re-mounting the base wall to the housing.

23. The method of claim 22, wherein the first curved wall portion is positioned proximal to the first end, and extends from a position that is proximal to the first side and the first end to a position that is proximal to the second side and the first end; and wherein the second curved wall portion is positioned proximal to the second end, and extends from a position that is proximal to the first side and the second end to a position that is proximal to the second side and the second end.

24. The method of claim 22, wherein the first circular, oval or elliptical wall of the first spool member extends upwardly from the base wall; and wherein the one or more curved wall portions of the second spool member include a first curved wall portion, a second curved wall portion, and a third curved wall portion, the first, second and third curved wall portions each extending upwardly from the base wall.

25. The method of claim 22, wherein the first circular, oval or elliptical wall of the first spool member extends upwardly from the base wall; and wherein the one or more curved wall portions of the second spool member include an oval or elliptical wall that extends upwardly from the base wall.

* * * * *